INVENTOR
PAUL MAUBORGNE

June 17, 1952     P. MAUBORGNE     2,600,558
FISHING REEL WITH NONROTARY BOBBIN
Filed Dec. 5, 1945     2 SHEETS—SHEET 2
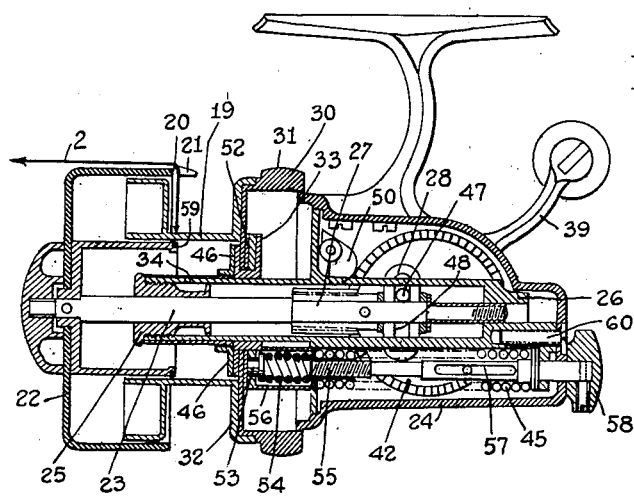
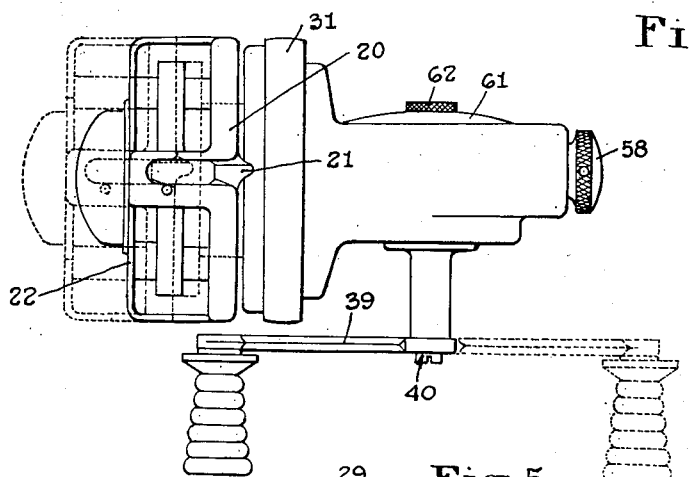
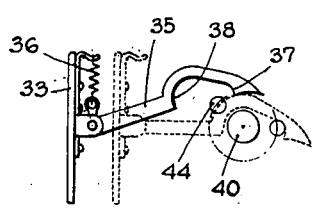
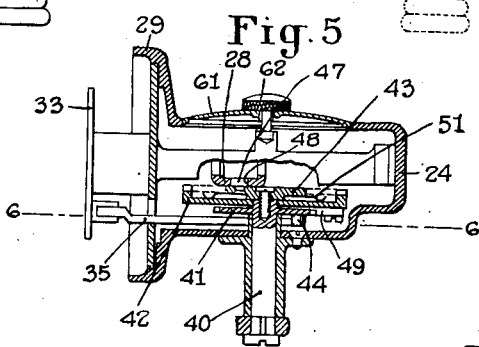
Inventor:
Paul Mauborgne
By Robic & Bastien
Attorneys Patented June 17, 1952

2,600,558

UNITED STATES PATENT OFFICE 2,600,558

FISHING REEL WITH NONROTARY BOBBIN

Paul Mauborgne, Niort, France

Application December 5, 1945, Serial No. 632,833
In France October 31, 1944

Section 1, Public Law 690, August 8, 1946
Patent expires October 31, 1964

4 Claims. (Cl. 242—84.4)

The present invention relates to fishing reels.

More specifically, this invention relates to fishing reels of the type having a non rotary drum: that is, a drum which does not rotate as the bait is cast.

In most fishing reels of this type, the line, after it has been cast, must be rewound on the drum by some sort of line pick-up device. Such a pick-up usually constitutes an arm rotatable around the drum and under the control of a crank or handle actuated by the fisherman. Such fishing reels have the disadvantage that, when the line is running out in a cast, it may possibly form a loop around the projecting pick-up arm, and become entangled therewith or even broken.

An important object resides in the provision of a fishing reel of the character described in which the rotatable flyer, carrying the line pick-up ring, and the drum are axially slideable relatively to one another to either a remote, line-casting position or an adjacent, line-rewinding position.

Other objects and advantages will become apparent, or be further pointed out in the description to follow.

Figure 1:
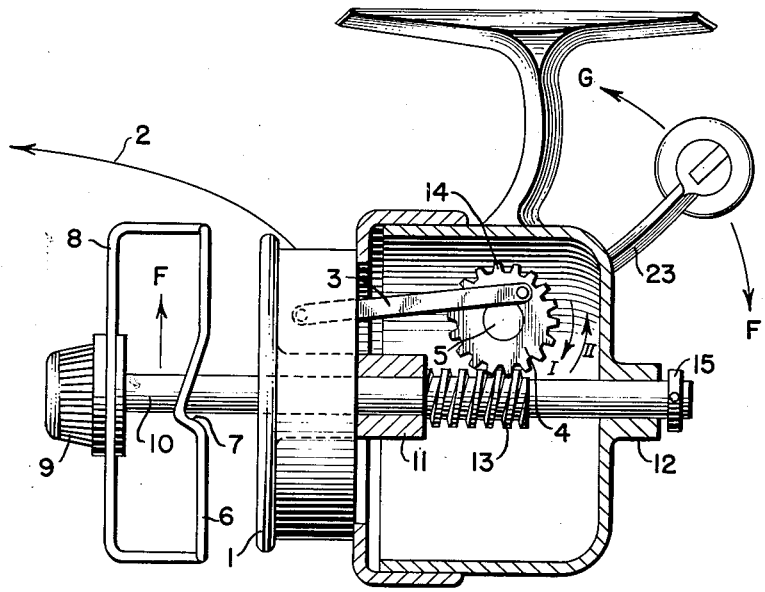
Figure 2:
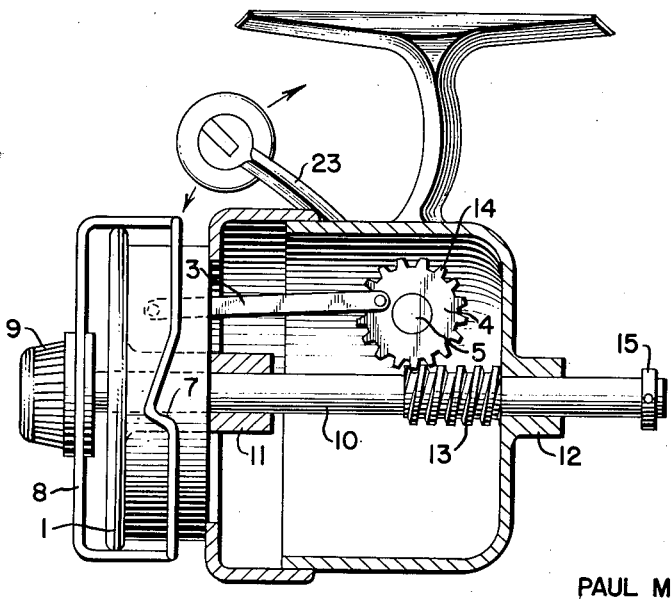

As an example, and for purposes of illustration only, a preferred embodiment of the invention is shown in the annexed drawings, wherein:

Fig. 1 shows a diagrammatic form of the fishing reel, the several parts being in position for casting, Fig. 2 is a view similar to Fig. 1, in which the parts are in the position for rewinding the line, Fig. 3 is an axial longitudinal section of a preferred form of construction of the reel, Fig. 4 is a plan view of the reel of Fig. 3, Fig. 5 is a partial cross section through the axis of the crank, and Fig. 6 is a section along the line 6—6 of Fig. 5.

Referring to the drawings, wherein the same reference characters denote corresponding parts throughout, Figs. 1 and 2 show that the reel is comprised mainly of a drum 1, carrying a line 2, and connected by means of a rod 3 with a wheel 4 keyed on the spindle 5 of the usual hand crank. This crank is not shown, but may be of any type suitable to be operated by the fisherman.

A ring 6, having a notch 7 therein, is secured on a support 8 of any suitable shape, which itself is mounted through the medium brake 9 of any preferred construction, upon a spindle 10. This spindle is slidably journalled in the bearings 11 and 12 which are solid with the reel housing (not shown).

Keyed on the spindle 10 is a worm gear 13 which meshes with a toothed wheel 14 secured to the spindle 5. A stop 15 limits the displacements towards the left (see Fig. 1) of the spindle 10 and of the parts secured on this spindle.

The operation is as follows:

To adjust the reel so that the parts thereof are in position for casting, the fisherman, by means of his crank, rotates the wheels 4 and 14 in the direction shown by the arrow 1 in Fig. 1. This causes the worm gear 13 to move towards the left in Fig. 1 against the bearing 11, and the ring 6 in turn moves to a position remote from the drum 1. The line 2 is then free to unwind from the drum and the ring 6, having no projection thereon, does not constitute an obstruction or source of danger to the unwinding line.

When it is desired to rewind the line on the drum, the crank is rotated in the direction indicated by arrow II in Fig. 1. The worm gear 13 is thus displaced by the toothed wheel 14 to a position against bearing 12. The ring 6, in turn, moves into a position encircling drum 1. When the worm gear 13 is in abutting position with bearing 12, further rotation of wheel 14 causes corresponding rotation of gear 13, and hence of the pick-up ring 6, in the direction indicated by the arrow F of Fig. 1. The line 2, which bears against the rotating ring, is then picked up by the notch 7 and is wound upon the drum. Meanwhile, the connecting rod 3, pivoted on the rotating wheel 4, is caused by the latter to impart a reciprocating motion to the drum which enables the line to be evenly distributed thereon.

Obviously, from the above, the reel may be simple in construction whilst giving a maximum of protection to the line.

It will be clear that, instead of having the pick-up displaced longitudinally between the casting and rewinding operation, the drum might be subjected to such displacement. And, in order to distribute the line evenly in rewinding, the pick-up, rather than the drum, might be imparted a reciprocating motion. Or either one of these parts might be held stationary whilst the other performs all longitudinal movements.

A preferred constructional form of the reel of the present invention is shown in Figs. 3 to 6. In this embodiment, it is the line pick-up member which undergoes the reciprocating axial movement during the rewinding operation, whilst both the pick-up and the drum are displaced axially to mutually remote positions prior to casting.

Fig. 3 shows that the pick-up 20 of the reel constitutes a closed ring having a line-engaging beak 21 thereon, and is affixed to a suitably shaped flyer 22. This flyer in turn, is rigidly mounted centrally on one end of a shaft 23. The shaft 23 extends into casing 24 of the reel and is rotatably and slidably journalled in two bearings 25 and 26 rigidly secured in the latter.

Inside the casing, between bearings 25 and 26, the shaft has keyed thereto a worm gear 27. It is also provided with a slotted strap 28, the purposes of which will be hereinafter described.

At the end facing flyer 22, the casing 24 widens out and has formed thereon a circular flange 29. Around this flange, a drum holder 30, having a projecting circumferential ring 31, is rotatably and slidably fitted. A plate 32, formed on drum holder 30 at the edge thereof nearest the flyer, projects inwardly towards shaft 23 and is rigidly secured to the drum 19 of the reel. This drum encircles, but is not secured to, shaft 23, since, in accordance with reels of this type, the drum does not rotate during the casting operation.

The plate 32 of the drum holder is retained, together with elements of a drum-braking mechanism hereinafter described, between the flanges of a double-flanged collar 33. This collar encircles the shaft, or any suitable sleeve 34 secured to bearing 25, and is slidable thereon. To one of the flanges of the collar is pivotally secured an arm 35, a spring 36 being disposed between this arm and collar 33 in order to maintain the former in the inoperative position shown in full outline in Fig. 6. The free end of the arm is shaped in the form of a hook 37, whilst midway between the ends a suitable bend is formed in the rod or arm in order to provide an abutment 38. Hook 37 and abutment 38 are adapted to engage the cranking mechanism of the reel as presently described.

A hand-crank 39 of any suitable shape is provided, and drives into the reel by means of a spindle 40 which enters casing 24 perpendicular to shaft 23. Inside the casing, spindle 40 has, in succession, a ratchet wheel 41 keyed thereto, a crown gear 42 rotatably mounted thereon and a circular plate 43 bolted to the end thereof.

Figures 5 and 6 show how rod 35 works with the cranking mechanism. A spring 36 holds the rod 35 in the position shown in full lines in Figure 6. Projecting from wheel 41 is a pin 44 and, upon rotation of spindle 40 in a clockwise direction, this pin engages hook 37 and displaces the rod, together with collar 33, towards the right in Fig. 4, while upon rotation of spindle 40 anticlockwise no such engagement of pin 44 and hook 37 will occur, rod 35 being withdrawn from engagement with pin 44 by the action of spring 36. By this means, the drum is displaced away from the flyer and the pick-up prior to casting. Longitudinally coiled in casing 24, and pressing (through the intervening drum-braking system to be later described) against collar 33, is a spring 45. This spring tends to hold the drum in an outward position closest to flyer 22 where the outer flange of collar 33 is pressed against a projecting stop 46 on sleeve 34 of bearing 25. Hence spring 45 is compressed when the drum and collar are drawn inwardly by pin 44.

Plate 43 is also provided with a pin 47 projecting from the surface thereof and this latter enters into slot 48 of strap 28 and slideably engages the latter. Since the strap is secured for axial movement with shaft 23, the latter, together with flyer 22, will have imparted thereto a reciprocating axial movement upon rotation of spindle 40.

The crown gear 42 has secured thereto a pawl 49 engageable with the teeth of ratchet wheel 41 so that, when the latter is rotated in a counter-clockwise direction (Figs. 5 and 6), gear 42 also rotates and, through worm gear 27, drives shaft 23. By means of any suitable friction pad such as 50, pivotally secured to casing 24, crown gear 42 may be prevented from rotating in the opposite direction.

If desired, leaf springs such as 51 may be interposed between plate 43 and gear 42 so as to tend to hold these two members in frictional engagement.

The reel operates as follows:

To bring the parts into position for casting, the crank is rotated in clockwise (Figs. 5 and 6) direction. As described, pin 44 engages hook 37 and draws the drum away from flyer 22, which latter is meanwhile being displaced in the opposite direction owing to the co-operation of pin 47 with strap 28. The pins 44 and 47 are so located on their respective plates that the drum and flyer reach a maximum mutually distant position as the abutment 38 approaches abutting position with spindle 40. As the latter two members come into contact, the moving parts of the reel are locked, for the shape of hook 37 prevents further rotation of the crank, whilst pin 44, which has moved just past the position shown in dotted lines in Fig. 6, is prevented from inadvertently being released from the locked position by the force of spring 45 tending to drive the crank onward.

It will be understood that, for the casting position, the flyer and pick-up are in the position indicated by dotted lines in Fig. 4. In bringing the parts of the reel to this position, crown gear 42 and worm gear 27 do not rotate.

In order to rewind the line, the reel has only to be cranked in the opposite, or counterclockwise (Fig. 6) direction. Pin 44 is then rotated in a direction to disengage hook 37, thus allowing the collar 33 and drum 19 to be driven outwardly to a position where the former abuts against stop 46 and the latter is encircled by pick-up ring 20.

Meanwhile, crown gear 42 is rotated as has been described and drives, in turn, the shaft 23 and pick up 20. The line-engaging beak 21 then catches the line and, owing to the reciprocating axial motion as well as the rotation of the pick-up and flyer, distributes the line evenly around drum 19.

It will be understood that, when a fish strikes the bait, or is being played on the line, the reel will almost invariably be in position for rewinding. For this reason, and in order to prevent breakage of the line, the drum of the reel, even though of the non-rotary casting type, must be able to revolve in order to feed line out of the pick-up during such times as the fish makes sudden, strong attempts to attain freedom.

For this purpose, any suitable friction-braking mechanism which prevents the drum from rotating except under a predetermined stress may be provided in the reel.

A suitable brake is shown in Fig. 3. In this case, a friction washer 52 is provided between the flanges of collar 33 and is pressed against plate 32 of the drum holder by means of a pad 53, this latter being forced through a slot in the inner collar flange by a spring 54. The other end of spring 54 abuts against a bolt 55 which is threaded through a cup 56 against the other side of which latter the spring 45 exerts pressure. Extending into casing 24 from cup 56, the shank of bolt 55 fits non-rotatably and slideably into the hollow shank of a bolt 57, and this latter has a knurled head 58 disposed outside the casing whereby adjustment may be effected of the combined force with which springs 45 and 54 press against the members associated with the drum holder. By this means, the stress at which plate 32 will begin to slip, and thus allow drum 19 to rotate, is rendered adjustable to any desired predetermined value.

By means of the projecting ring 31 of drum holder 30, such slipping or rotating of the drum may be arrested at will by firmly placing a finger on this ring.

The reel may also be provided with suitable sealing members such as 59, slideably disposed between the drum and flyer. These would prevent dust, moisture, etc., from entering the reel casing.

In order to render disassembly of the reel a simple operation, bearings 25 and 26 might be connected by a frame, or a suitably slotted and notched sleeve, and then secured to casing 24 by means of a single bolt 60. Moreover, the housing 24 might be provided with an access plate or cover 61 securable in closed position by means of the single, knurled-headed, screw 62. Such means render it easy for a fisherman to have access to the reel mechanism in order to clean, oil and carry out repairs of the latter.

What I claim is:

1. In a fishing reel including a drum arranged to hold a line and mounted for free delivery of the line therefrom substantially axially of the drum, the drum being held against rotation during delivery of the line, and a line pick-up ring arranged to encircle the drum, the provision of single means rotatable in one direction for axially displacing the ring to a position remote from the drum and in the other direction to return the ring to a position encircling the drum and for rotating the ring to wind in the line in drum-encircling position.

2. In a fishing reel including a drum arranged to hold a line and mounted for free delivery of the line therefrom substantially axially of the drum, the drum being held against rotation during delivery of the line, and a line pick-up ring arranged to encircle the drum, the provision of single means rotatable in one direction for axially displacing the drum to a position remote from the ring and in the other direction to return the drum to a position encircled by the ring and for rotating the ring to wind in the line in drum-encircling position.

3. In a fishing reel including a drum arranged to hold a line and mounted for free delivery of the line substantially axially of the drum, the drum being held against rotation during delivery of the line, and a line pick-up ring arranged to encircle the drum, the provision of single means rotatable in one direction for imparting relative axial motion to at least one of the drums and rings thereby to displace them to mutually remote positions and in the other direction to return them to a position wherein the ring encircles the drum and for rotating the ring in drum-encircling position thereby to wind in the line.

4. In a fishing reel including a drum arranged to hold a line, a reel casing, a shaft rotatably and axially slideably journalled in said casing, said drum being concentric with said shaft and mounted in non rotatable, axially-slideable relationship on said casing in position for delivery of line, and a flyer keyed to said shaft having a line pick-up ring thereon adjacent the line-delivering side of the drum: a crank having a spindle rotatably journalled in said casing perpendicular to said shaft, means connecting said spindle with said shaft comprising a wheel keyed to the spindle having a protruding pin thereon, a strap slideable with the shaft having a slot therein perpendicular to the latter, said pin slideably engageable in said slot whereby rotation of the wheel causes reciprocating axial motion of the shaft, a gear keyed to said shaft, and a crown gear on said spindle rotatable therewith in one direction only and engageable with the worm gear to rotate the latter, a spring in said casing arranged to urge said drum towards said flyer, and means arranged to connect the spindle with the drum comprising a wheel keyed to the spindle having a projection thereon, a rod pivoted to the drum having a hooked extremity engageable with said projection and a bent portion therein, whereby rotation of the spindle in one direction causes said projection to engage the hooked extremity of said rod and displace the drum away from the flyer, said displacement of the drum being limited by the abutment of the bent portion of said rod with the spindle to prevent further rotation of the crank and to lock the parts of the reel in position for delivery of line, whereby rotation of the crank in one direction causes axial displacement of the pick-up and drum to mutually-remote positions and in the other direction causes axial displacement and rotation of the pick-up and axial displacement of the drum to positions where the former encircles the latter and rotates therearound to rewind line thereon.

PAUL MAUBORGNE.

REFERENCES CITED

The following references are of record in the file of this patent:

UNITED STATES PATENTS

| Number | Name | Date |
| --- | --- | --- |
| 2,314,616 | Gaire | Mar. 23, 1943 |
| 2,344,209 | Lowe | Mar. 14, 1944 |

FOREIGN PATENTS

| Number | Country | Date |
| --- | --- | --- |
| 22,597 of 1907 | Great Britain | June 11, 1908 |
| 354,960 | Great Britain | Aug. 20, 1931 |
| 389,622 | Great Britain | Mar. 23, 1933 |
| 487,818 | Great Britain | June 17, 1938 |
| 909,825 | France | Mar. 20, 1946 |